United States Patent
Imao

[11] Patent Number: 6,000,517
[45] Date of Patent: Dec. 14, 1999

[54] AUTOMATIC CLUTCH OPERATING APPARATUS

[75] Inventor: Toshio Imao, Nagoya, Japan

[73] Assignee: Aichi Kikai Kogyo Kabushiki Kaisha, Nagoya, Japan

[21] Appl. No.: 09/089,511

[22] Filed: Jun. 3, 1998

[30] Foreign Application Priority Data

Aug. 15, 1997 [JP] Japan ..................................... 9-235412

[51] Int. Cl.⁶ .............................. F16D 19/00; F16D 13/44
[52] U.S. Cl. .................................... 192/85 CA; 192/84.6; 192/90
[58] Field of Search ......................... 192/84.6, 90, 91 R, 192/20, 85, 85 CA

[56] References Cited

U.S. PATENT DOCUMENTS

| | | | |
|---|---|---|---|
| 4,591,034 | 5/1986 | Tellert et al. .......................... | 192/84 X |
| 4,596,316 | 6/1986 | Crossman ................................ | 192/84 X |
| 5,372,106 | 12/1994 | Botterill ................................. | 192/84 X |
| 5,421,440 | 6/1995 | Kumagai .................................. | 192/90 |
| 5,680,916 | 10/1997 | Borschert et al. .................. | 192/84.6 X |
| 5,704,462 | 1/1998 | Grosspietsch et al. ............... | 192/85 C |

*Primary Examiner*—Charles A Marmor
*Assistant Examiner*—Roger Pang
*Attorney, Agent, or Firm*—Dennison, Meserole, Scheiner & Schultz

[57] ABSTRACT

An automatic clutch control apparatus which can rapidly perform the disconnection of a friction clutch of a transmission by the assistance of the accumulated load in a coil spring comprising a motor 4 rotatable forward and backward; reduction means 27, 23 for reducing the rotation of the motor 4; movement conversion means 19, 21, 15, 9 for converting the rotation of the motor to the axial movement of a piston rod 6; a hydraulic master cylinder 3 including the piston rod 6 for supplying working oil into a friction clutch to compress a spring in the clutch so that the clutch will be disconnected; a coil spring 31 provided on the piston rod 6 of the hydraulic master cylinder 3 so as to accumulate the load by the compression due to the repulsive force of the spring in the clutch when the motor 4 is rotated backward to connect the clutch and so as to release the accumulated load when the motor 4 is rotated forward.

3 Claims, 2 Drawing Sheets

6,000,517

AUTOMATIC CLUTCH OPERATING APPARATUS

BACKGROUND OF THE INVENTION

1. Field of the Invention

The present invention relates to an automatic clutch operating apparatus for performing the connection and disconnection of the friction clutch for an automotive transmission by an electronically-controlled motor-driven operation device through a hydraulic master cylinder and a hydraulic operating cylinder.

2. Prior Art

In a transmission of an automobile, utilization of so-called automatic hydraulic pressure generator is known where a friction clutch is connected or disconnected by a hydraulic master cylinder operated by a computer-controlled motor. In such an automatic hydraulic pressure generator, an operation device for operating a hydraulic master cylinder by a motor is disclosed in DE-A No.4433824. In the constitution of the operation device, a worm is provided on an output shaft of a motor, and a piston rod of the hydraulic master cylinder is connected by a pin to a worm wheel meshing with the worm. According to such constitution, rotation of the motor is reduced by the worm and the worm wheel and thereby torque is increased. Further, by utilizing the lever ratio due to the difference of the distance between the rotation center of the worm wheel and the connection point of the piston rod and the distance between the rotation center of the worm wheel and the meshing point of the worm and the worm wheel, the torque is increased and the rotary motion of the worm wheel is converted into the linear motion of the piston rod.

However, since the operation device in DE-A No.4433824 intends to increase the torque utilizing the meshing of the worm and the worm wheel, it is disadvantageous that the motion of the piston rod is slow, the hydraulic cylinder can not operate rapidly and the responsibility of control to connect and disconnect the friction clutch is deteriorated.

Further, since the worm and the worm wheel mesh with each other substantially in point contact and the pressure is concentrically applied in the worm axis direction to the meshing point of the worm and the worm wheel, it is disadvantageous that the durability of the worm is liable to deteriorate.

SUMMARY OF THE INVENTION

An object of the invention is to provide an automatic clutch operating apparatus in which the forward rotation of a motor is reduced through a reduction means and converted through a movement conversion means into the axial movement, the piston rod of a hydraulic master cylinder is moved in the axial direction, the working oil from the hydraulic master cylinder is supplied through the hydraulic operating cylinder into a friction clutch to compress the spring in the clutch, so that the clutch is disconnected.

Another object of the invention is to provide an automatic clutch operating apparatus in which the piston rod of a hydraulic master cylinder is provided with a load accumulating means which can accumulate the load by the compression due to the repulsive force of the spring in the clutch when the motor is rotate backward to connect the clutch and which can release the accumulated load when the motor is rotated forward to disconnect the clutch.

A further object of the invention is to provide an automatic clutch operating apparatus in which control valves for controlling the working oil are provided between a hydraulic master cylinder and a hydraulic operating cylinder to maintain the accumulating condition of a load accumulating means.

A still further object of the invention is to provide an automatic clutch operating apparatus in which when the clutch of a transmission is disconnected, the piston rod of a hydraulic master cylinder can be strongly pressed and moved by the driving force of the motor and the accumulated load in a load accumulating means, so that the disconnection of the friction clutch can be extremely fast and strongly performed.

Still another object of the invention is to provide an automatic clutch operating apparatus in which the friction clutch is composed of a dry monoplate clutch with a diaphragm spring, the load accumulating means is composed of a compression coil spring provided around the outer circumference of the piston rod of a hydraulic master cylinder, and the control valves are composed of solenoid valves.

A further object of the invention is to provide an automatic clutch operating apparatus in which the coil spring can accumulate the load by the compression due to the repulsive force of the diaphragm spring in the friction clutch and the solenoid valves can properly control the connection and disconnection of the clutch by ON-OFF control, so that the disconnection of the clutch can be fast and strongly performed according to the accumulated urging force of the coil spring and the ON-OFF control of the solenoid valves.

A still further object of the invention is to provide an automatic clutch operating apparatus which is formed in a compact constitution provided with a movement-conversion means and a piston rod of a hydraulic master cylinder disposed in parallel to each other and provided with a counter lever which is adapted to sway on the fulcrum and connect the respective ends of the conversion means and the piston rod.

DESCRIPTION OF THE PREFERRED EMBODIMENT

An embodiment of the present invention will be described in detail with reference to FIG. 1 hereinafter. The automatic clutch operating apparatus of the invention is constituted as shown in a sectional view of FIG. 1. In the upper side of the center line C of FIG. 1, the apparatus is illustrated in the state of a pressure generating chamber S1, which will be described later, in the maximum capacity, that is, the friction clutch of an automotive transmission, which is not shown, is in the connected condition. Also, in the lower side of the center line C, the apparatus is illustrated in the state of the pressure generating chamber S1 in the minimum capacity due to the movement of the piston rod of a hydraulic master cylinder, that is, the said friction clutch is in the disconnected condition.

Figure 1:
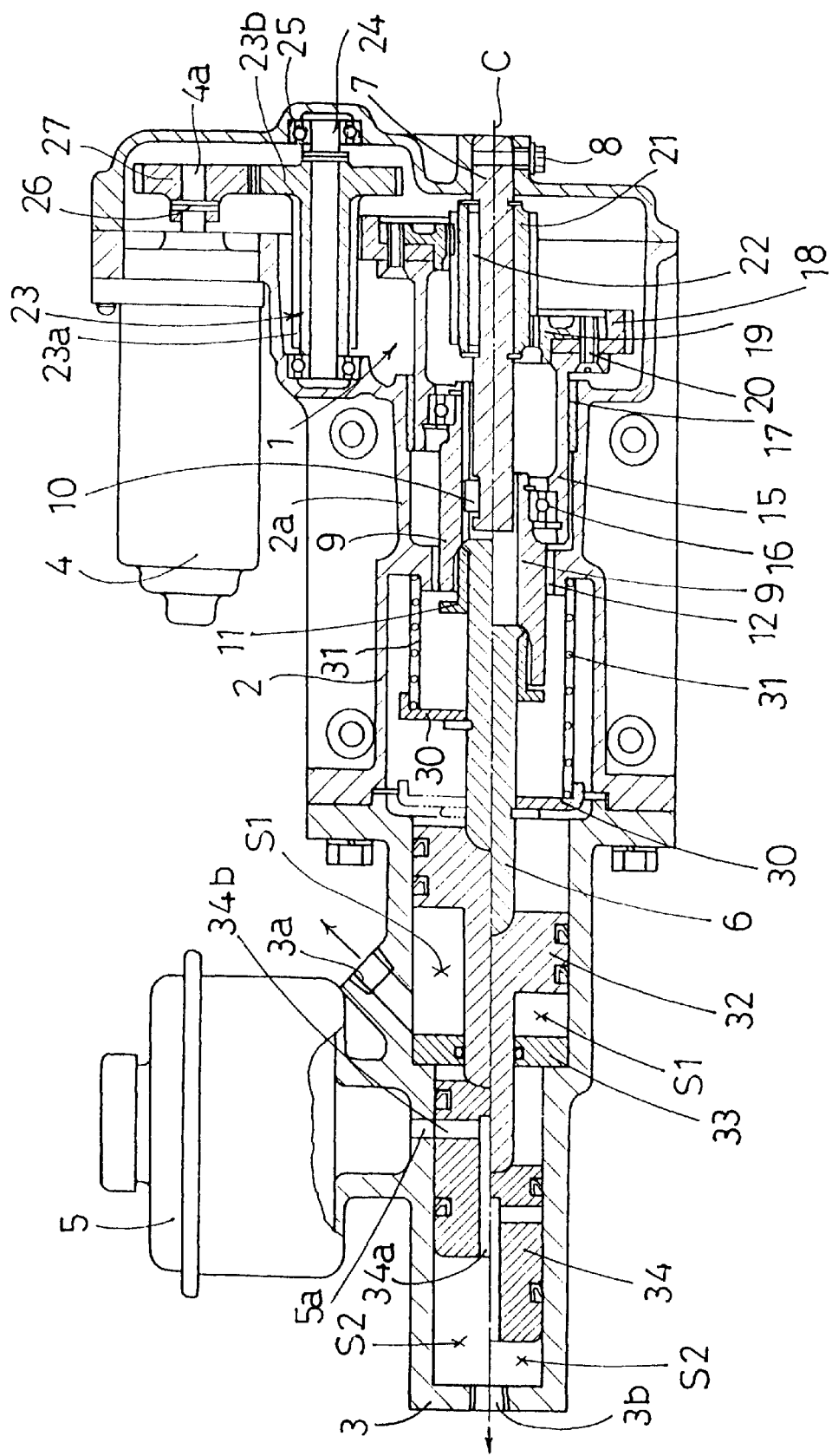
FIG. 1 is a sectional view of an embodiment of the clutch operating apparatus.

In FIG. 1, the automatic clutch operating apparatus for performing the connection and disconnection of the friction clutch (not shown) of an automotive transmission by the computer control comprises a housing 2 incorporating an operation device 1, a hydraulic master cylinder 3 mounted on the front side of the housing 2, and a motor 4 mounted on the upper side of the housing 2. Further, the apparatus comprises reservoir 5 connected and arranged on the upper side of the hydraulic master cylinder 3.

The motor 4 is rotatable forward and backward and is driven and controlled by a computer (not shown). The hydaulic master cylinder 3 has connection ports 3a, 3b communicating with the pipings for an operating cylinder of a friction clutch (not shown). When a piston rod 6 of the hydraulic master cylinder 3 is moved forward through the operation device 1 by drive of the motor 4, the hydraulic master cylinder 3 generates hydraulic pressure and supplies it to the operating cylinder, and when the piston rod 6 is moved rearward, the hydraulic pressure is released.

The housing 2 has a cylindrical portion 2a, in which the piston rod 6 is projected from the front side, and a stationary shaft 7, coaxial and opposite to the piston rod 6, is fixed to the rear side through a fixing screw 8 and is positioned within the cylindrical portion 2a.

On the front side of the stationary shaft 7, a sleeve 9 is mounted slidablly in the axial direction, but not rotatablly, through a slide key 10, and the front end of the sleeve 9 is tightened and fixed to the bulged rear end of the piston rod 6 through a flared nut 11. Also, on the inner circumference of the front side of the cylindrical portion 2a, a bearing 12 is mounted and slidably engaging with the outer circumference of the sleeve 9. In the cylindrical portion 2a, the front end of a slider 15 is coupled with the rear end part of the sleeve 9 so as to be rotatable relatively to and movable integrally with the sleeve 9 in the axial direction through a slider bearing 16 comprising a ball bearing. That is, the rear end part of the sleeve 9 is fixed to an inner race of the slider bearing 16 and the front end of the slider 15 is fixed to an outer race of the slider bearing 16. Also, the outer circumference of the slider 15 is guided by a bearing 17 mounted on the inner circumference of the cylindrical portion 2a. At the rear side of the slider 15, a slider side actuator gear 18 having outer circumferential teeth and a female screw member 19 with a female screw formed on the inner circumference are fixed in overlaid state in the axial direction by screws 20–20 (only one is shown in the figure). Also, at the rear part of the stationary shaft 7 positioned in the inside of the female screw member 19, a male screw member 21 meshing with the female screw member 19 is fixed not to be rotatable through a fixing key 22.

On the upper side of the slider side actuator 18, a counter-shaft side actuator gear 23 is positioned. The counter-shaft side actuator 23 is mounted on a counter shaft 24 which is in parallel to the stationary shaft 7, and the counter shaft 24 is supported at both ends on the housing 2 through ball bearings 25, 25. The counter-shaft side actuator 23 comprises a first gear part 23a meshing with the slider side actuator gear 18 and a second gear part 23b of larger diameter with teeth more in number than the first gear part 23a. Length of the first gear part 23a (length in the axial direction) is formed longer than that of the slider side actuator gear 18 and thereby the slider 15 can be moved in the axial direction as described later. Also, the second gear part 23b meshes with a motor side actuator gear 27 mounted on the motor shaft 4a of the motor 4 through a spring pin 26 and having teeth less in number than the second gear part 23b. The motor side actuator gear 27, the counter side actuator gear 23 and the slider side actuator gear 18 constitute actuator gear train which reduces rotation of the motor 4 and transmits the reduced rotation to the slider 15.

When the motor 4 is started, rotation of the motor 4 is reduced by the actuator gear train comprising the motor side actuator gear 27, the counter-shaft side actuator gear 23 and the slider side actuator gear 18 and the reduced rotation is transmitted to the slider 15. Then, by meshing of the female screw member 19 fixed to the slider 15 and the male screw member 21 of the stationary shaft 7, the slider 15 attendant on the rotation is moved forward with respect to the stationary shaft 7 (to the left in the figure), and together with the slider 15, the sleeve 9 and further the piston rod 6 are moved forward and attain to the forward moving position as shown in lower half of the figure and the hydraulic pressure is generated in the hydraulic master cylinder 3.

Next, in order that the hydraulic pressure generating state is transferred to the hydraulic pressure release state, the motor 4 is rotated in the backward direction. Then, the slider 15 is moved rearward with respect to the stationary shaft 7 (to the right in the figure), and together with the slider 15, the sleeve 9 and further the piston rod 6 are moved rearward and the hydraulic pressure release state is produced. Next, the features of the present invention will be described in detail. On the outer circumference of the piston rod 6 of the hydraulic master cylinder 3 is secured an engaging plate 30, and around the outer circumference of the piston rod 6 is disposed a coil spring 31 which is in the state where the one end of the spring 31 is supported on the engaging plate 30 and the other end on the outside of the cylindrical portion 2a of the housing. This coil spring 31 is compressed to accumulate the load when the piston rod 6 is moved to the right in the figure.

In the hydraulic master cylinder 3 are formed a main pressure generating chamber S1 and a supplementary pressure generating chamber S2. The main pressure generating chamber S1 is formed between a main chamber piston 32 and a press-fitted stationary member 33 which is forcibly fitted in and fixed to the hydraulic master cylinder 3. The main chamber piston 32 is disposed coaxially with the piston rod 6 and adapted to move subsequently to the movement of the piston rod 6.

The supplementary pressure generating chamber S2 is formed between a supplementary chamber piston 34 and the outside wall of the hydraulic master cylinder 3. The supplementary chamber piston 34 is disposed coaxially with and in the left side (in the figure) of the main chamber piston 32. Also, in this supplementary chamber piston 34 are provided a communicating passage 34a in the axial direction and a communicating passage 34b orthogonally crossing the communicating passage 34a. The communicating passage 34b is constituted so as to be capable of agreeing with an open passage 5a formed in the bottom of the reservoir 5.

In the hydraulic master cylinder 3 is formed a main chamber port 3a communicating with the main pressure generating chamber S1 and also formed a supplementary chamber port 3b communicating with the supplementary pressure generating chamber S2. To those communicating ports 3a, 3b are respectively connected control valves (not shown) through hydraulic pipings in the respective downstreams. Each control valve is connected to a hydraulic operating cylinder (not shown), which is adapted to supply the working oil through a clutch release mechanism to the friction clutch of an automotive transmission (not shown).

In this embodiment, the friction clutch of the transmission is composed of a dry monoplate clutch with a diaphragm spring, and the respective control valves disposed in the downstreams of the communicatin ports 3a, 3b are constituted by solenoid valves.

Incidentally, the motor side actuator gear 27 and counter-shaft side actuator gear 23 constitute a reduction means for reducing the rotation of the motor 4, and the male thread member 21, female thread member 19, slider side actuator gear 18, slider 15, sleeve 9, etc. constitute a movement conversion means for converting the rotation into the axial movement. The coil spring 31 makes up a load accumulating means whch can accumulate the load.

In such a constitution, when the disconnection of the friction clutch of the transmission (not shown) is started, each control valve (solenoid valve) communicating with the main pressrue generating chamber S1 and the supplementary pressure generating chamber S2 is made in the open condition. The motor 4 is rotated in the forward direction to press the piston rod 6 to the left side through the reduction means and the movement conversion means. At this time, the coil spring 31 accumulating the load by compression extends to the left side as discharging the load and presses the piston rod 6 to the left side to assist the driving power of the motor 4. Thereby, the main chamber piston 32 and the supplementary chamber piston 34 are pressed and moved to the left side, and the main pressure generating chamber S1 and the supplementary pressure generating chamber S2 are compressed. Then, the working oil is supplied into the hydraulic operating cylinder (not shown) through the respective control valves from the communicating ports 3a, 3b. As a result, the diaphragm spring in the friction clutch of a transmission is pressed to disconnect the friction clutch. Thus, the disconnection of the friction clutch is started strongly and fastly by the driving force of the motor 4 and the urging force of the coil spring 31.

Thus, when the disconnection of the friction clutch is completed, each control valve (not shown) is closed and the working oil is tightly held in the hydraulic operating cylinder (not shown), and as a result, the friction clutch is maintained in the completely disconnected condition.

Next, when the connection of the friction clutch is started, only the main chamber side control valve (not shown) communicating with the main pressure generating chamber S1 is opened, the motor 4 is operated in the backward rotation, and the movement of the piston rod 6 to the right side in the figure is started. At this time, the working oil is returned into the main pressure generating chamber S1 of the hydraulic master cylinder 3 owing to the repulsive force of the diaphragm spring of the friction clutch (not shown), and the main chamber piston 32 is moved to the right side in the figure. Thereby, the piston rod 6 is moved to the right side in the figure, gradually compressing the coil spring 31 to accumulate the load therein.

When the motor 4 is stopped, the main-chamber side control valve (not shown) communicating with the main pressure generating chamber S1 is closed, the working oil is tightly held in the main chamber S1. At this time, the coil spring 31 is maintained in a compressed condition to accumulate the load therein. Even after the connection of the friction clutch is completed, the load is accumulated and held in the coil spring 31.

While the main-chamber side control valve is in the open condition, the supplementary-chamber side control valve communicating with supplementary pressure generating chamber S2 is in the closed condition, and as a result, the supplementary chamber piston 34 in the supplementary pressure generating chamber S2 is maintained in the former position. When the main-chamber side control valve is closed just before the completion of the connection of the friction clutch (not shown), the supplementary-chamber side control valve is opened, the entir working oil remained in the hydraulic operating cylinder is returned in the supplementary pressure generating chamber S2. Thereby, the supplementary-chamber piston 34 which is left behind is moved until it is brought into contact with the end of the main chamber piston 32. As a result, the communicating passage 34b of the supplementary chamber piston 34 is positioned to agree with the open passage 5a of the reservoir 5, so that the working oil except that in the main pressure generating chamber S1 is laid open to the atmosphere, and the operating force to the friction clutch is completely released.

In the embodiment of the present invention as described above, the disconnection of the friction clutch is performed when the spring in the friction clutch (not shown) is compressed by the driving force of the forward rotation of the motor 4 through the clutch release mechanism operated by the working oil filled in the hydraulic master cylinder 3, hydraulic piping and hydraulic operating cylinder. This spring in the friction clutch exerts the repulsive force to the above-described coil spring 31 through the clutch release mechanism and the working oil, so that the load can be accumulated in the compressed coil spring 31. After this, when the disconnection of the friction clutch is started by the forward rotation of the motor 4, the accumulated load in the coil spring 31 is released, and the working oil is fast and strongly supplied by the driving force of the motor 4 and the urging force of the coil spring 31 into the hydraulic operating cylinder from the pressure generating chambers S1 and S2 in the hydraulic master cylinder 3, so that the friction clutch can be rapidly disconnected. Thereby, the driving power transmitted to the transmission from the engine can be fast and strongly cut.

Figure 2:
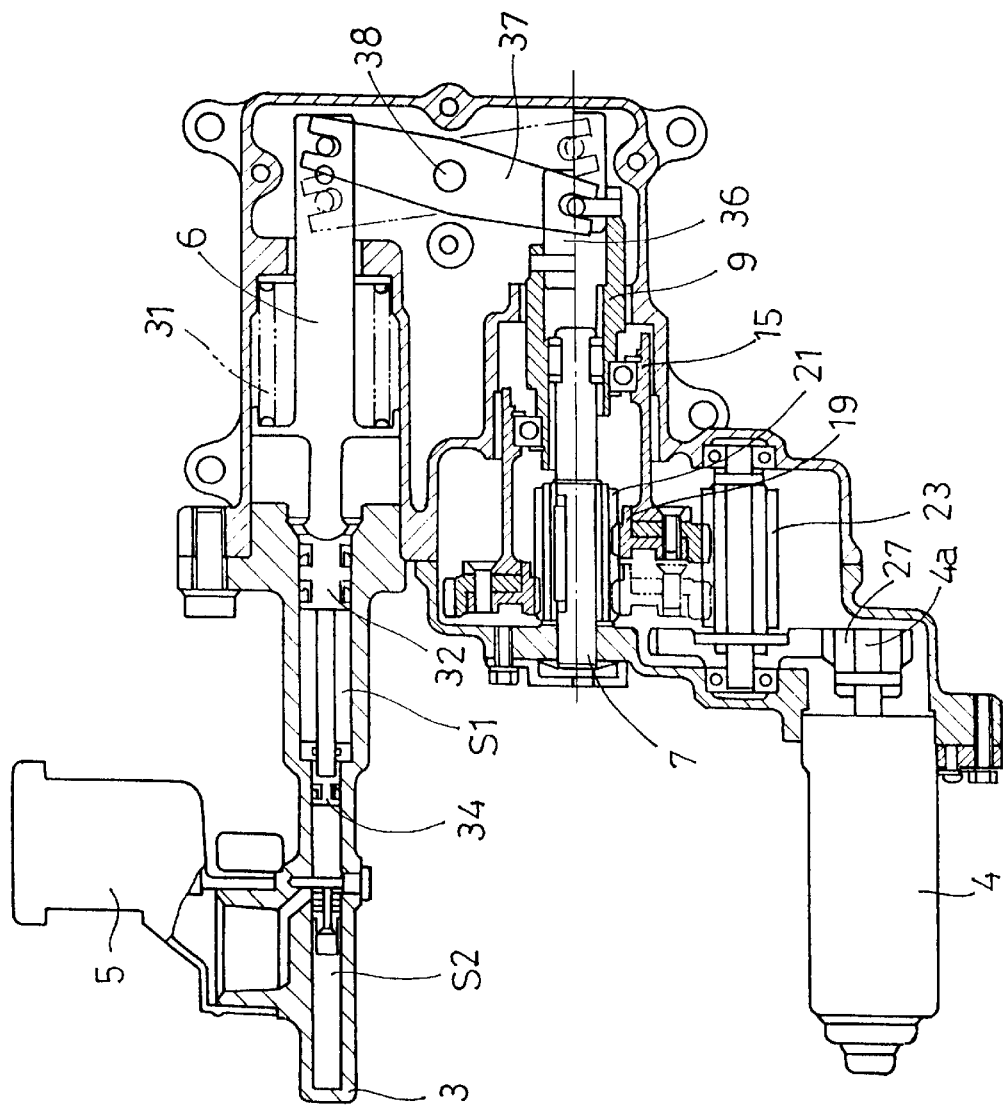
FIG. 2 is a sectional view of a compact type embodiment of the clutch operating apparatus.

Next, the another embodiment of the present invention will be described with reference to FIG. 2. In order to make the entire clutch operating apparatus in a compact form, the stationary shaft 7 in the motor side and the piston rod 6 in the hydraulic master-cylinder side are separated and disposed in parallel. On the right end in the figure of the stationary shaft 7 is coaxially provided a moving shaft 36 connected to the sleeve 9. To the end of this moving shaft 36 is connected one end of a counter lever 37, which can sway on a fulcrum shaft 38 positioned at the center thereof. The upper end in the figure of the lever 37 is coupled to one end of the piston rod 6, around the circumference of which is disposed the coil spring 31. To the left end in the figure of the piston rod 6 is connected the main chamber piston 32, further in the left side of which is disposed the supplementary chamber piston 34. With respect to the same components to those in FIG. 1, the particular description is omitted by adopting the same references to the latter.

According to such a constitution, although the moving shaft 36 and the piston rod 6 move oppositely to each other through the counter lever 37, the longitudinal length of the entire clutch operating apparatus is reduced by half, so that it is possible to make the entire apparatus in an extremely compact form.

What is claimed is:

1. An automatic operating apparatus for controlling a friction clutch, comprising:

a motor rotatable forward and backward;

means for reducing the rotation of said motor;

movement conversion means for converting the reduced rotation of the motor to the axial movement of a piston rod;

a reservoir with working oil;

a hydraulic master cylinder including said piston rod supplying working oil into a friction clutch through a hydraulic operating cylinder to compress a spring in a clutch so that the clutch becomes disconnected; and load accumulating means provided on the piston rod of said hydraulic master cylinder so as to accumulate the load by the compression due to the repulsive force of the spring in said friction clutch when the motor is rotated backward to connect the clutch and to release the accumulated load when the motor is rotated forward.

2. The automatic clutch operating apparatus as defined in claim 1, wherein said load accumulating means includes a compression coil spring provided around the outer circumference of the piston rod of said hydraulic cylinder.

3. The automatic clutch operating apparatus as defined in claim 1, wherein said movement conversion means and the piston rod of the hydraulic master cylinder are disposed in parallel, and a counter lever is provided which can sway on a fulcrum to connect an end of said movement conversion means with an end of the piston rod.

* * * * *